Dec. 29, 1931.  H. W. LUEK ET AL  1,838,424
MILK CAN VENTILATING COVER
Filed May 25, 1929
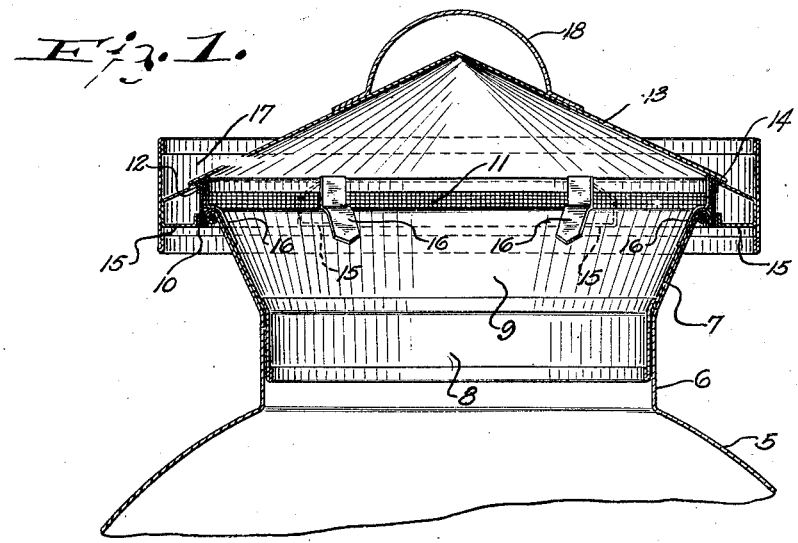
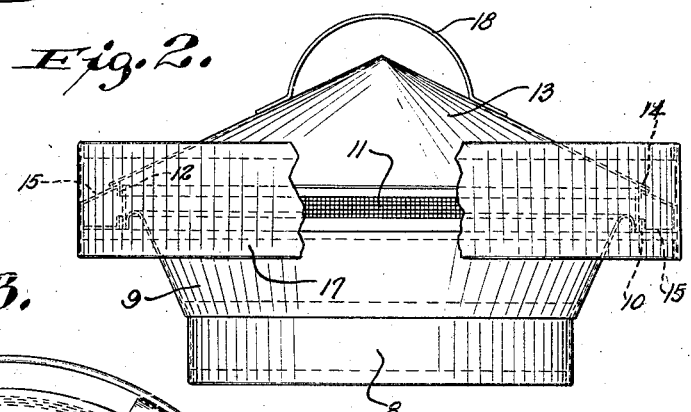
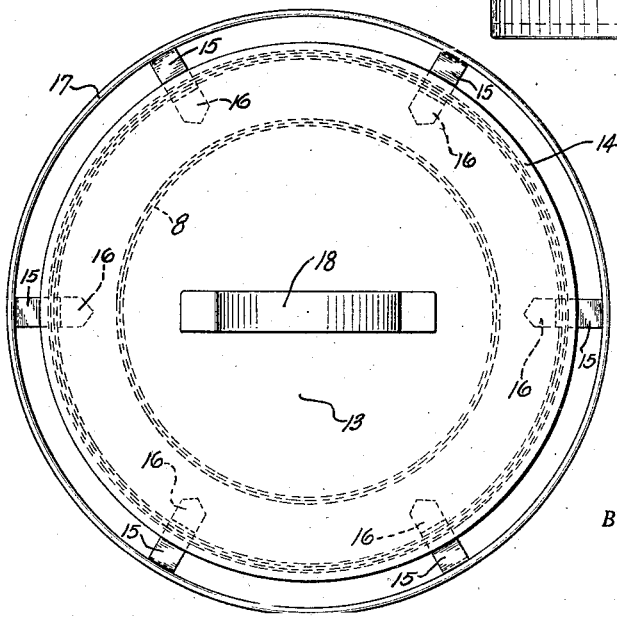
INVENTORS
Harry W. Luek &
August C. Krueger
BY Morsell, Kenney & Morsell
ATTORNEYS Patented Dec. 29, 1931

1,838,424

UNITED STATES PATENT OFFICE

HARRY W. LUEK AND AUGUST C. KRUEGER, OF PARDEEVILLE, WISCONSIN

MILK CAN VENTILATING COVER

Application filed May 25, 1929. Serial No. 366,016.

This invention relates to improvements in milk can ventilating covers.

Fresh milk just taken from cows is quite hot and the vessel or container into which it is introduced should be left open or ventilated in order to permit access of the air to the milk. Ordinarily the containers are left uncovered which is an unsanitary practice as the entrance of germs, dust, and foreign matter into the milk is not guarded against.

It is an object of the present invention to provide a cover for a milk can which will ventilate the contents of the can, but will prevent the entrance of rain, dust, insects, or wind-blown particles.

A further object of the invention is to provide a milk can cover which is formed with an annular screened ventilating opening laterally shielded by a spaced annular guard, and shielded from the drippage of water or rain by an annular overhanging top portion.

A further object of the invention is to provide a milk can ventilating cover adapted for the ordinary form of milk can, which is strong and durable, which is inexpensive to manufacture, and which is well adapted for the purposes described.

With the above and other objects in view the invention consists of the improved milk can ventilating cover, and its parts and combinations as set forth in the claims, and all equivalents thereof.

In the accompanying drawings in which the same reference characters indicate the same parts in all of the views:

Fig. 1 is a fragmentary sectional view of the upper neck portion of a milk can with the improved ventilating cover fitted thereon, the latter being shown in section;

Fig. 2 is a side view of the ventilating cover with a portion of the annular guard broken away; and Fig. 3 is a plan view of the cover.

Referring now more particularly to the drawings it will be seen that the numeral 5 indicates a milk can having the usual upstanding neck 6 with an upper, outwardly flared portion 7.

The improved ventilating cover is formed with a lower annular collar portion 8, from the upper portion of which extends an annular outwardly flared portion 9. The upper edge of said flared portion 9 is formed with a downturned flange 10 bent to provide a U-shaped recess which clampingly receives the lower edge portion of an annular fine mesh screen 11. The upper edge portion of said screen member extends into a U-shaped opening in a downturned flange 12 of a top member 13. Said top member is shaped as shown in Figs. 1 and 2, and is inclined outwardly downwardly from its mid-portion. The outer periphery of said top member extends over, and overhangs the upper flange 12 and the screen 11 so as to form an eave or a water shed, as indicated at 14.

The top member 13 is spacedly connected to the flange 10 of the flared portion 9 by means of a plurality of outer spaced U-shaped brackets 15 and a plurality of inner spaced straps 16.

For the purpose of laterally shielding or guarding the screened entrance 11 an outer annular guard member or wall 17 is provided, said guard member being considerably wider than the screened opening 11 and being secured to the outer sides of the brackets 15, so as to be spaced thereby from the screened opening 11. The guard member 17, as shown, is vertically disposed.

For convenience in handling the improved cover a handle 18 is mounted on the outer surface of the top member 13.

When the improved ventilating cover is applied to the milk can 5 the lower collar portion 8 of the cover enters the neck portion 6 of the can and interiorly engages the inner surface thereof. The flared portion 9 of the cover lodges against the inner surface of the outwardly flared portion 7 of the milk can neck and the screened opening 11 of the cover is disposed immediately above the upper periphery of the neck portion 7 of the can. By this arrangement air can enter the can through the screened opening 11 of the cover and the milk in the can will be cooled by the incoming air and will be ventilated. The screen 11 is of a fine mesh so as to prevent the entrance of foreign particles and insects and the laterally spaced guard member 17 permits the entrance of air from both above and below to the screened opening but laterally shields or guards the screened opening against wind and rain and wind-blown particles. The overhanging eave portion 14 of the cover serves to prevent drippage and moisture from entering the screened opening.

From the foregoing description it will be seen that the improved milk can ventilating cover efficiently ventilates a milk can, but at the same time the cover is so constructed that the entrance of germs, water and foreign matter into the milk can is guarded against. Furthermore, the cover is both simple and novel and is well adapted for the purposes described.

What is claimed as the invention is:

1. A container cover, comprising a body member having a top portion and a side portion with an opening therein, and a laterally spaced guard member for said opening carried by said body member, and spaced outwardly of the top and side portions thereof, there being an open space between the guard and said body member.

2. A container cover, comprising a body member having a top portion and a side portion with an opening therein, and a guard member of greater height than said opening and parallel with said side portion spacedly supported from said body member laterally outwardly of said side portion and its opening and the top portion, there being an open space between the guard and said body member.

3. A container cover, comprising a body member having a top portion and an annular side portion with an annular ventilating opening therein, and an annular guard member for said opening carried by said body member and spaced laterally, outwardly of the top and side portion, there being an open space between the guard and said body member.

4. A container cover, comprising a body member having a top portion and an annular side portion with an annular screened opening therein, and an annular guard member of greater height than said opening spacedly supported from said body member laterally outwardly of said opening and said top portion, there being an open space between the guard and said body member.

5. A container cover, comprising a body member having a downwardly inclined top portion, a lower container neck engaging portion, and an intermediate annular vertical wall, there being an elongated opening in said vertical wall, a screen within said opening, a vertically disposed guard member of greater dimensions than the dimensions of said opening and positioned spacedly outwardly of the same and outwardly of the outer periphery of the top portion, there being an open space between said guard and the body member, and bracket members connecting the guard member to said body member.

6. A container cover, comprising a body member having a downwardly inclined top portion, a lower container neck engaging portion, and an intermediate, annular vertical wall, there being a narrow annular opening in said intermediate wall, a fine mesh screen within said opening, the lower edge portion of said top portion overhanging the annular opening, a vertically disposed guard member of greater width than said opening and parallel with said vertical wall and positioned spacedly outwardly of the same and outwardly of the lower edge portion of the top portion, there being an open space between said guard and the body member, and bracket members connecting the guard member to said body member.

In testimony whereof, we affix our signatures.

HARRY W. LUEK.
AUGUST C. KRUEGER.